(12) United States Patent
Kuenzner

(10) Patent No.: US 9,575,627 B2
(45) Date of Patent: Feb. 21, 2017

(54) DISPLAY AND OPERATING DEVICE

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1526 days.

(21) Appl. No.: 11/526,035

(22) Filed: Sep. 25, 2006

(65) Prior Publication Data

US 2007/0016370 A1    Jan. 18, 2007

Related U.S. Application Data

(63) Continuation of application No. PCT/EP2005/002626, filed on Mar. 11, 2005.

(30) Foreign Application Priority Data

Mar. 24, 2004  (DE) .......... 10 2004 014 390

(51) Int. Cl.
  *G06F 3/0482* (2013.01)
  *B60K 35/00* (2006.01)
  *B60K 37/06* (2006.01)

(52) U.S. Cl.
  CPC ............ *G06F 3/0482* (2013.01); *B60K 35/00* (2013.01); *B60K 37/06* (2013.01); *B60K 2350/1004* (2013.01)

(58) Field of Classification Search
  USPC .... 715/788, 821, 843, 822; 345/184; 701/36
  See application file for complete search history.

(56) References Cited

U.S. PATENT DOCUMENTS

| 5,270,689 A | 12/1993 | Hermann |
| 5,761,646 A * | 6/1998 | Frid-Nielsen ......... G06F 3/0481 715/769 |
| 5,828,376 A | 10/1998 | Solimene et al. |
| 5,916,288 A * | 6/1999 | Hartman .......... 701/36 |
| 6,119,186 A * | 9/2000 | Watts .......... G06F 9/44505 710/104 |
| 6,401,029 B1 * | 6/2002 | Kubota et al. .......... 701/201 |
| 6,466,654 B1 * | 10/2002 | Cooper et al. .......... 379/88.01 |
| 7,038,717 B2 * | 5/2006 | Dow et al. .......... 348/231.3 |
| 2004/0046751 A1 * | 3/2004 | Heimermann et al. ....... 345/184 |

FOREIGN PATENT DOCUMENTS

| DE | 3836555 A1 | 5/1990 |
| DE | 29604717 U1 | 5/1996 |
| DE | 197 15 325 A1 | 10/1998 |

(Continued)

OTHER PUBLICATIONS

"Neues Windows Fuer Autos kommt 2006" CT Magazin Fuer Computer Technik, May 2005, No. 11, p. 37, XP002328469.

(Continued)

*Primary Examiner* — Alvin Tan
(74) *Attorney, Agent, or Firm* — Crowell & Moring LLP

(57) ABSTRACT

In a display and operating device for the functions of a menu, which includes multiple functions, in a vehicle having a screen display and input device for preselection of a function by dialing a respective screen symbol, all the functions of the menu may be displayed simultaneously on the screen display and may be preselected individually in a visually discernible manner by the input device. The preselected functions are jointly activatable in response to a switch command.

18 Claims, 2 Drawing Sheets

(56) References Cited

FOREIGN PATENT DOCUMENTS

| | | |
|---|---|---|
| DE | 198 52 237 A1 | 5/2000 |
| DE | 100 56 307 A1 | 5/2002 |
| DE | 200 22 795 U1 | 6/2002 |
| DE | 102 29 890 A1 | 1/2004 |
| EP | 0 701 926 B2 | 3/1996 |
| EP | 0 796 765 A2 | 9/1997 |
| EP | 1 110 795 A2 | 6/2001 |
| GB | 2 363 044 A | 12/2001 |
| JP | 2-187814 A | 7/1990 |
| JP | 11-220726 A | 8/1999 |
| WO | WO 03/036455 A1 | 5/2003 |

OTHER PUBLICATIONS

International Search Report dated May 30, 2005 with an English translation of the pertinent portion (six (6) pages).
German Search Report dated Jan. 1, 2005 with an English translation of the pertinent portion (eight (8) pages).

* cited by examiner

DISPLAY AND OPERATING DEVICE

CROSS-REFERENCE TO RELATED APPLICATIONS

This application is a continuation of PCT International Application No. PCT/EP2005/002626, filed on Mar. 11, 2005, which claims priority under 35 U.S.C. §119 to German Application No. 10 2004 014 390.0, filed Mar. 24, 2004, the entire disclosures of which are expressly incorporated by reference herein.

BACKGROUND AND SUMMARY OF THE INVENTION

The invention relates to a display and operating device for the functions of a menu including multiple functions in a vehicle having a screen display and an input device for preselection of a function by selecting a respective screen symbol.

A device of the above-mentioned type is known from DE 38 36 555 A, wherein the functions of a menu are called up individually using an input device designed as a pushbutton-rotary switch. As a rule, only one function may be preselected per menu.

It is also known from DE 102 29 890 A that the functions of a menu may be displayed simultaneously on a screen. There, an option is provided for selecting individual functions therefrom and activating the individual functions. The selected individual functions, activated simultaneously when they are selected, are displayed on a separate screen.

The object of the present invention is to create a device of the above-mentioned type, wherein a greater freedom in the choice of functions of a menu is granted to a vehicle user by a simple procedure.

This object is achieved by the present invention through a display and operating device for the functions of a menu including multiple functions in a vehicle having a screen display and an input device for preselection of a function by selecting a respective screen symbol. All the functions of the menu may be displayed simultaneously on the screen display; a partial extent of these functions may be preselected; and this partial extent of preselected functions may be activated jointly in response to a switch command.

Since all the functions of the menu are displayed simultaneously on the screen display, the user of the vehicle has a complete overview of the input and operating options offered by that particular menu. The user need not make a decision from items one after the other without knowing the subsequent options. This prevents premature decisions and the associated attempts to correct these decisions. It is thus possible to define the effective functions of the menu rapidly and in a clear-cut manner.

In contrast with the device known from DE 102 29 890 A, the user also has an opportunity to correct his selection up until the end, i.e., until he implements the decision to, in fact, activate the selected functions. In the present invention, the selection process is uncoupled in time from the activation process.

One example may illustrate this. As part of the "Settings" menu, it should be possible to have warning information played back acoustically and/or visually. If the user of the vehicle receives the two alternatives "acoustic playback" and "visual playback" separately and one after the other, it is not usually possible to make a clear-cut decision without leaving doubt for the type of playback he would in fact like to have. However, if the two options are offered/presented simultaneously to the user of the vehicle, the decision will be made rapidly, correctly and in a clear-cut manner.

Further advantageous embodiments of the invention are described and claimed herein.

For the preselection of the partial extent of the functions relevant for the user, several alternatives may be considered. This partial extent may be identical to the partial extent activated in a previous operating phase.

The partial extent may also be automatically preselected in accordance with the respective operating state and/or the respective operating conditions of the vehicle. Operating states that may be mentioned include the instantaneous vehicle speed and driving in forward gear or in reverse gear. Operating conditions include, for example, ambient brightness, the inside or outside temperature, or the seat occupancy.

The partial extent may also be preselected individually. A cursor, such as that known from screen displays from the PC field, in particular may be used as input devices for the individual preselection of functions. The entire selection process can be performed especially rapidly if a pushbutton-rotary switch is used, so the screen symbols are approached one by one with a rotary movement and the functions thus approached can be selected by pressing the button.

The menu with its functions may likewise be called up on the screen display with such a pushbutton-rotary switch. Menu selection and changing between different menus are greatly improved by comparison with a switch allocated individually to each menu, such that when the switch is operated, the functions of the menu on the screen display can be displayed and/or activated simultaneously.

A visual emphasis of the functions then activated on the screen display may be associated with activation of the preselected functions as input means. According to the optical and technical circuit design, it may be possible to differentiate between preselection, selection and actual activation of the respective function.

The visual emphasis may also be limited in time following the input of the switch command. Thus, the visual support is provided only as long as is necessary and appropriate for safely performing the selection process.

Other objects, advantages and novel features of the present invention will become apparent from the following detailed description of the invention when considered in conjunction with the accompanying drawings.

DETAILED DESCRIPTION OF THE DRAWINGS

Figure 1:
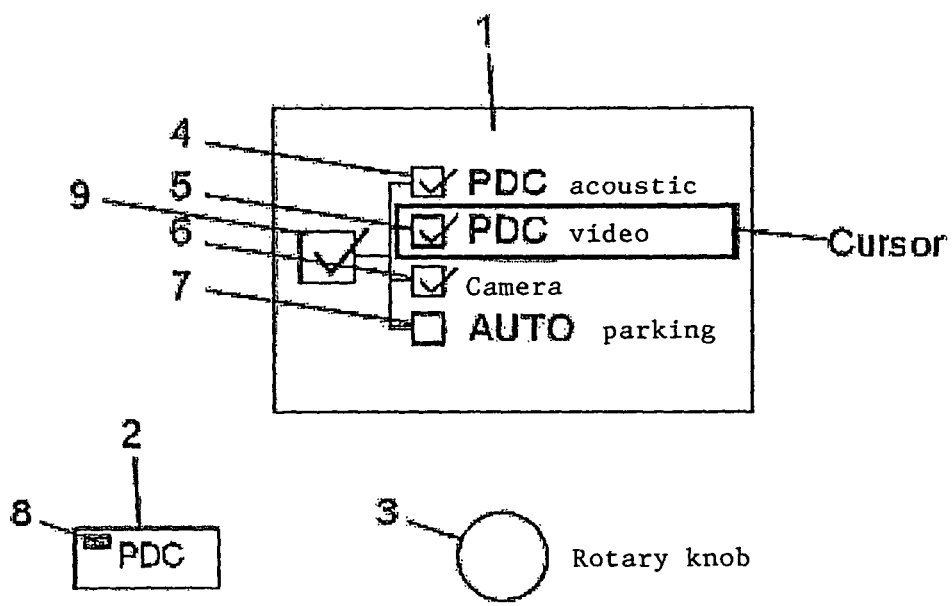
FIG. 1 illustrates a display screen on which all functions of a "parking" menu are represented, for example, along with an allocated parking menu switch and a push button-rotary selection switch.

The embodiments of the invention are illustrated in three schematic diagrams (FIG. 1, FIG. 2 and FIG. 3) in the drawings.

In the embodiment of FIG. 1, all the functions of a "parking" menu are represented on a screen 1 as an example; these functions can be retrieved and displayed on the screen 1 by operating an allocated switch 2. Using a manual operating device 3 in the form of a pushbutton-rotary switch such as is known from DE 38 36 555 A (having U.S. counterpart U.S. Pat. No. 5,270,689), the functions are preselectable one by one and then selectable. To do so, by rotating the operating device 3, the designation of each of the functions ("PDC acoustic," "PDC video," "camera" and "AUTO parking") are approached one by one and emphasized visually, for example, with black lettering against a bright rectangular background ("cursor"). The approach corresponds to the preselection of the respective function.

To select a function, the operating device 3 is depressed for each of the functions. In this example, this is true of the functions "PDC acoustic," "PDC video" and "camera". "AUTO parking" is not selected. The selection of these functions is indicated, for example, by a hook, "checkmark", or other indicator in a respective field 4 through 7 (the checkmark shown here in fields 4 through 6).

The functions are activated in conjunction with the selection. This is indicated by an LED 8 in the switch 2 and a checkmark in a field 9, which is displayed on screen 1.

Figure 2:
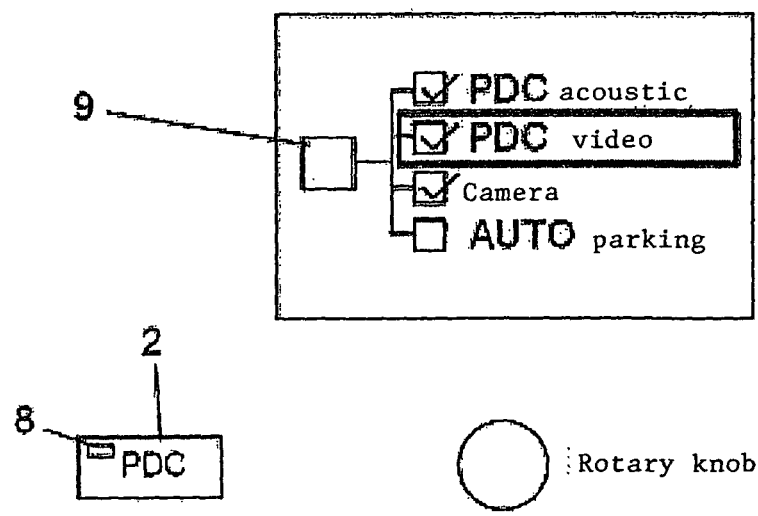
FIG. 2 is similar to FIG. 1 showing the functions of the parking menu deactivated.

If the functions of the menu and thus the entire "parking" menu are to be deactivated, the switch 2 is pressed again. As an acknowledgment for the user, the LED 8 is then extinguished and the checkmark in field 9 disappears. This is indicated in FIG. 2.

Figure 3:
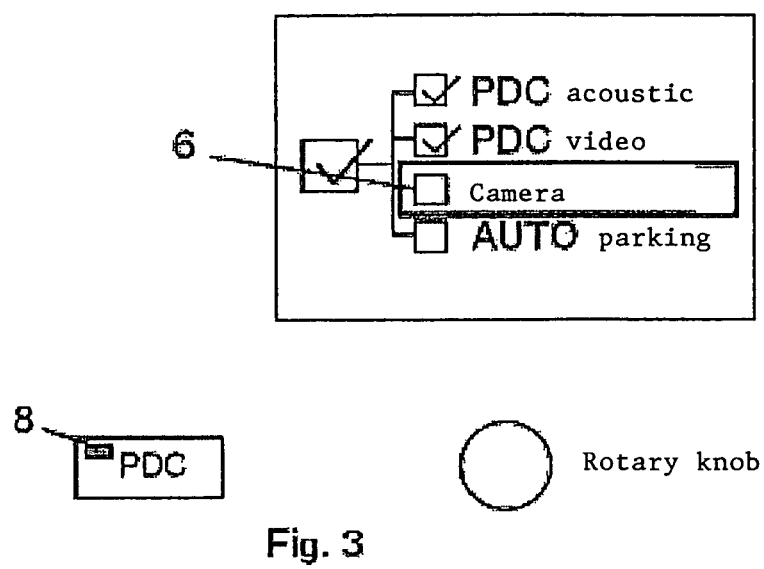
FIG. 3 is similar to FIGS. 1 and 2 and shows the activated state of a different number of functions of the parking menu.

If the compilation of functions for the parking procedure is to be altered, this can be done in the preselected state (FIG. 2) and/or in the selected state (FIG. 1) of the menu functions. For example, if the "camera" function is not desired, the cursor is moved to "camera" and the preselection is reset by depressing the operating device 3. The checkmark in the field 6 is then deleted. The selection of functions is also altered for the next retrieval or the next activation of the menu. The respective screen display is shown in FIG. 3 for the "menu activated" state according to FIG. 1.

The menu retrieved may also be deactivated automatically after a predetermined time, for example, one minute, has elapsed if no change in the menu has been made during this period of time, preferably by operation of the operating device 3 (time out). Alternatively, deactivation may also occur by depressing the switch 2 again, as already mentioned.

It may then be appropriate to prepare the menu again for a possible change without activating/deactivating all the functions of the menu by operation of the switch 2. To do so, a proximity sensor, a touch sensor, or the like, may be provided for the switch 2 so that the menu is retrieved again on approach to the switch 2 without altering the status of the menu function. Then, as described previously, the individual function may be activated/deactivated with the operating device without having to turn on/off the complete set of menu functions. The complete set of menu functions is activated/deactivated only by depressing the switch 2.

The invention requires only a few switches for its implementation (here, only the menu-specific switch 2). Special equipment such as a "camera" (for observing the environment of the vehicle) does not necessitate "hardware variants" due to different switch configurations, but only results in an altered display menu and setting menu.

An alternative procedure for the inventive device will now be explained for the example given above in conjunction with performing a parking operation. Again, the switch 2 is activated. On the basis of the external parameters (e.g., vehicle speed greater than 10 km/h, driving forward), it is unlikely that a parking operation that is performed by driving in reverse is to be started in which the PDC and rear camera will be needed.

On operation of the switch 2, a preselection of the functions possible for activation is then made automatically. These functions are also in fact activated. In this case, this is merely the "AUTO parking" function. Then, a parking place measurement is performed, as explained in EP 0 305 907, for example. If the user would also like to activate another function included in the menu displayed, he may then at any time correct the preselection performed automatically by the device in the manner described here.

On operation of the switch 2 when the vehicle is stationary, PDC and rear camera are preselected and activated automatically in view of a probable imminent parking operation in reverse, as indicated above.

Due to the option of activating multiple functions simultaneously and optionally also deactivating them again simultaneously, this results in a definite gain in convenience.

Additional menus for which the invention offers a definite gain in convenience include, for example, the functions of sporty driving option of the vehicle, electric heating of different areas in the interior of the vehicle and/or the longitudinal and/or transverse dynamics of the vehicle or the display functions that are actually displayed in a head-up display. Of course, while the examples given here relate primarily to a land vehicle, the display and operating device of the invention is applicable to any vehicle, such as for example, a water or air vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display and operating device in a vehicle, comprising:
   a display screen on which a menu comprising multiple functions is displayable;
   an input device for preselection of a function of the menu by selecting a respective screen symbol for the function;
   wherein all functions of the menu are displayable simultaneously on the display screen; and
   wherein a plurality of preselected functions are simultaneously displayed on the display screen and, subsequently, are jointly activated in response to a switch command received after the plurality of preselected functions are displayed on the display screen.

2. The device according to claim 1, wherein the plurality of simultaneously displayed functions are preselectable individually by the input device.

3. The device according to claim 2, wherein the input device is a push button-rotary switch, a rotary movement of which highlights the screen symbols one by one; wherein a highlighted screen symbol is selectable by a pushing motion of the push button-rotary switch.

4. The device according to claim 3, further comprising a switch allocated individually to menus displayable on the display screen, wherein when the switch is operated, at least one of the following occurs: the functions of the menu are displayed simultaneously on the display screen, the selected functions of the menu are activated, and activated functions of the menu are deactivated.

5. The device according to claim 2, further comprising a switch allocated individually to menus displayable on the display screen, wherein when the switch is operated, at least one of the following occurs: the functions of the menu are displayed simultaneously on the display screen, the selected functions of the menu are activated, and activated functions of the menu are deactivated.

6. The device according to claim 1, wherein the plurality of simultaneously displayed functions are identical to those functions activated in an immediately prior operating phase of the menu.

7. The device according to claim 6, further comprising a switch allocated individually to menus displayable on the display screen, wherein when the switch is operated, at least one of the following occurs: the functions of the menu are displayed simultaneously on the display screen, the selected functions of the menu are activated, and activated functions of the menu are deactivated.

8. The device according to claim 1, wherein the plurality of simultaneously displayed functions are preselected automatically based on at least one of a particular operating state and particular operating conditions of the vehicle.

9. The device according to claim 8, further comprising a switch allocated individually to menus displayable on the display screen, wherein when the switch is operated, at least one of the following occurs: the functions of the menu are displayed simultaneously on the display screen, the selected functions of the menu are activated, and activated functions of the menu are deactivated.

10. The device according to claim 1, further comprising a switch allocated individually to menus displayable on the display screen, wherein when the switch is operated, at least one of the following occurs: the functions of the menu are displayed simultaneously on the display screen, the selected functions of the menu are activated, and activated functions of the menu are deactivated.

11. The device according to claim 1, wherein a visual emphasis of activated functions on the display screen is associated with activation of the preselected functions.

12. The device according to claim 11, wherein the visual emphasis occurs after an input of the switch command for a predetermined time.

13. A method of operating functions in a vehicle having a display screen, the method comprising the acts of:
  displaying all functions of a particular menu simultaneously on the display screen;
  preselecting a plurality of the functions on the display screen using an input device; and
  jointly activating the preselected plurality of the functions in response to a switch command that is received after the displaying and preselecting acts have been performed.

14. The method according to claim 13, wherein the act of preselecting the plurality of the functions further comprises the act of preselecting each of the plurality of functions individually by use of the input device.

15. The method according to claim 14, wherein the input device is a push button-rotary switch, and further comprising the act of rotating the push button-rotary switch to cause a highlighting of a symbol representing the functions of the menu on the display screen one-by-one, wherein a respectively highlighted symbol is selectable by a pushing movement of the push button-rotary switch.

16. The method according to claim 13, wherein upon displaying all functions of the particular menu, automatically identifying the plurality of the functions corresponding to a prior plurality of functions activated in a prior operating phase of the particular menu.

17. The method according to claim 13, wherein upon displaying all functions of the particular menu, automatically preselecting the plurality of the functions based on at least one of a particular operating state and particular operating conditions of the vehicle.

18. The method according to claim 13, further comprising the act of
  jointly deactivating the activated functions in response to another switch command.

* * * * *